(12) United States Patent
Yago

(10) Patent No.: US 8,395,813 B2
(45) Date of Patent: Mar. 12, 2013

(54) SUBTRACTIVE COLOR METHOD, SUBTRACTIVE COLOR PROCESSING APPARATUS, IMAGE FORMING APPARATUS, AND COMPUTER-READABLE STORAGE MEDIUM FOR COMPUTER PROGRAM

(75) Inventor: Kazuya Yago, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 975 days.

(21) Appl. No.: 12/463,580

(22) Filed: May 11, 2009

(65) Prior Publication Data

US 2009/0303505 A1    Dec. 10, 2009

(30) Foreign Application Priority Data

Jun. 10, 2008   (JP) ................................. 2008-152188

(51) Int. Cl.
*H04N 1/60* (2006.01)
(52) U.S. Cl. ......... 358/1.9; 358/463; 382/162; 382/168; 382/173; 382/254; 382/232; 345/593; 345/589
(58) Field of Classification Search ........................ None
See application file for complete search history.

(56) References Cited

U.S. PATENT DOCUMENTS

| | | | | | |
|---|---|---|---|---|---|
| 5,222,154 | A | * | 6/1993 | Graham et al. | 382/162 |
| 5,307,182 | A | * | 4/1994 | Maltz | 358/518 |
| 5,317,420 | A | * | 5/1994 | Kuwahara | 358/463 |
| 5,454,050 | A | * | 9/1995 | Nakabayashi et al. | 382/165 |
| 6,128,407 | A | * | 10/2000 | Inoue et al. | 382/167 |
| 6,134,023 | A | * | 10/2000 | Nozaki et al. | 358/1.9 |
| 6,272,250 | B1 | * | 8/2001 | Sun et al. | 382/225 |
| 6,411,730 | B1 | * | 6/2002 | Bartell et al. | 382/168 |
| 6,529,202 | B2 | * | 3/2003 | Wu | 345/593 |

(Continued)

FOREIGN PATENT DOCUMENTS

| | | |
|---|---|---|
| JP | 01-204569 | 8/1989 |
| JP | 6-103371 A | 4/1994 |

(Continued)

OTHER PUBLICATIONS

David J. Kappos, Subject Matter Eligibility of Computer Readable Media, Feb. 23, 2010, USPTO, 1351 OG 212.*

(Continued)

*Primary Examiner* — King Poon
*Assistant Examiner* — Ted Barnes
(74) *Attorney, Agent, or Firm* — Buchanan Ingersoll & Rooney PC

(57) ABSTRACT

A most used color that is a most popularly used color is obtained in an image. Pixel groups formed of continued pixels having an identical color other than the most used color in the image is extracted as first pixel groups. Pixel groups having a color of which a color difference with respect to the most used color is smaller than a predetermined threshold and having a size thereof that is smaller than a predetermined size is extracted as third pixel groups among the first pixel groups thus extracted. The first pixel groups other than the third pixel groups are taken as second pixel groups. An image is generated by replacing colors of portions, which correspond to the second pixel groups in an image having an area identical with that of an image to be processed and filled with the most used color, with the corresponding second pixel groups, respectively.

5 Claims, 18 Drawing Sheets

U.S. PATENT DOCUMENTS

| | | | |
|---|---|---|---|
| 6,546,130 B1* | 4/2003 | Inoue et al. | 382/162 |
| 6,650,772 B1* | 11/2003 | Inoue et al. | 382/162 |
| 6,701,010 B1* | 3/2004 | Katsuyama | 382/165 |
| 6,731,789 B1* | 5/2004 | Tojo | 382/162 |
| 6,735,341 B1 | 5/2004 | Horie et al. | |
| 6,778,697 B1* | 8/2004 | Shin et al. | 382/164 |
| 6,944,342 B1* | 9/2005 | Stahl et al. | 382/224 |
| 6,990,235 B2* | 1/2006 | Katsuyama | 382/173 |
| 7,031,548 B2* | 4/2006 | Baggs | 382/261 |
| 7,120,300 B1* | 10/2006 | Sankar | 382/190 |
| 7,426,301 B2* | 9/2008 | Porikli | 382/181 |
| 7,453,467 B2* | 11/2008 | Kim | 345/589 |
| 7,463,787 B2* | 12/2008 | Atsumi et al. | 382/272 |
| 7,551,799 B2* | 6/2009 | Rai et al. | 382/275 |
| 7,606,414 B2* | 10/2009 | Boregowda et al. | 382/162 |
| 7,623,712 B2 | 11/2009 | Dai et al. | |
| 7,630,541 B2* | 12/2009 | Zitnick, III | 382/162 |
| 7,697,175 B2* | 4/2010 | Saka et al. | 358/514 |
| 7,949,181 B2* | 5/2011 | Padfield et al. | 382/164 |
| 8,175,155 B2* | 5/2012 | Suwa et al. | 375/240.12 |
| 8,189,914 B2* | 5/2012 | Hong | 382/172 |
| 8,189,941 B2* | 5/2012 | Miyasaka | 382/255 |
| 2002/0027561 A1* | 3/2002 | Wu | 345/593 |
| 2002/0101618 A1* | 8/2002 | Endo | 358/3.22 |
| 2005/0008222 A1* | 1/2005 | Gallina | 382/162 |
| 2005/0157926 A1* | 7/2005 | Moravec et al. | 382/173 |
| 2005/0180645 A1* | 8/2005 | Hasegawa et al. | 382/239 |
| 2006/0197985 A1* | 9/2006 | Yoda et al. | 358/1.18 |
| 2007/0008560 A1* | 1/2007 | Eschbach | 358/1.9 |
| 2007/0217701 A1* | 9/2007 | Liu et al. | 382/234 |
| 2007/0279650 A1* | 12/2007 | Zitnick | 358/1.9 |
| 2007/0280531 A1* | 12/2007 | Zitnick | 382/162 |
| 2008/0107331 A1* | 5/2008 | Kojima et al. | 382/162 |
| 2008/0317336 A1* | 12/2008 | Mojsilovic | 382/162 |
| 2009/0244662 A1* | 10/2009 | Kubo et al. | 358/512 |
| 2011/0235904 A1* | 9/2011 | Mojsilovic | 382/164 |

FOREIGN PATENT DOCUMENTS

| | | |
|---|---|---|
| JP | 06-301773 | 10/1994 |
| JP | 08-051540 | 2/1996 |
| JP | 08-202328 | 8/1996 |
| JP | 2000-013605 | 1/2000 |
| JP | 2000-222420 | 8/2000 |
| JP | 2002-300412 A | 10/2002 |
| JP | 2005-184404 | 7/2005 |
| JP | 2005-338902 | 12/2005 |
| JP | 2005-348435 | 12/2005 |
| JP | 2006-344069 | 12/2006 |
| JP | 2008-028717 | 2/2008 |
| JP | 2008-042545 | 2/2008 |

OTHER PUBLICATIONS

Notification of Reason(s) for Refusal issued in the corresponding Japanese Patent Application No. 2008-152188 dated Apr. 20, 2010, and an English Translation thereof.

* cited by examiner

Rn1

SUBTRACTIVE COLOR METHOD, SUBTRACTIVE COLOR PROCESSING APPARATUS, IMAGE FORMING APPARATUS, AND COMPUTER-READABLE STORAGE MEDIUM FOR COMPUTER PROGRAM

This application is based on Japanese Patent Application No. 2008-152188 filed on Jun. 10, 2008, the contents of which are hereby incorporated by reference.

BACKGROUND OF THE INVENTION

1. Field of the Invention

The present invention relates to a subtractive color method applied to image data that has been scanned by a scanner, and an image forming apparatus etc. that perform subtractive color processing.

2. Description of Related Art

In recent years, digitization of information has been progressing, and it has become common to digitize information recorded on a paper medium for storing. When performing digitization, a document is scanned using a scanner, and image data obtained by scanning is converted into a predetermined storing format and stored as digitized data. Presently, PDF (Portable Document Format) is widely used as the storing format. When the image data is converted into a file in PDF format and stored, an amount of data thereof can be greatly reduced. However, when a file in PDF format (PDF file) is generated, usually, compression using the JPEG (Joint Photographic Experts Group) method is performed on the image data. As a result, a slight degradation in image quality is inevitable. Accordingly, to maintain a compression ratio unchanged while the image quality is kept as high as possible, there is proposed a method for performing compression that is suited to each area included in an image (target image) represented by the image data to be stored. According to this method, a PDF file is generated, for example, in a way as described below.

First, an area represented by an object such as text, photograph, table, graph, or graphics included in the target image is extracted. Then, it is determined whether the extracted area is a text area or a non-text area. Binarization is performed on the text area, and one representative color is decided for the text. Further, compression processing by taking the legibility of the text into account is performed. Compression processing at a high compression rate is performed on a photograph area. Image processing such as subtractive color processing is performed on an area that is neither the text area nor the photograph area (hereinafter, referred to as "graphics/table/graph area"), namely, a table area, a graph area, or a graphics area, and compression is performed thereon with a high resolution maintained. Thereafter, a PDF file is generated by using the compressed data of individual areas.

With this arrangement, it is possible to output a PDF file having a higher image quality while having a similar amount of data as in the conventional method.

As shown in FIG. 18, an image of graph has the characteristics of including many of portions that are supposed to be expressed by a single color such as a bar portion AB in a bar graph and a background portion AH serving as a background to the bar. A table and graphics also have similar characteristics. Usually, when a document is scanned, a plurality of colors are included in such an area which is supposed to be expressed by a single color because of uneven density in color. Accordingly, for such an object including many portions that are supposed to be expressed in a single color, such as graph, table, and graphics, the image quality and the compression ratio are expected to be improved particularly by performing the subtractive color processing thereon. As an art relating to the subtractive color processing, such technologies as described in JP-2002-300412-A and JP-H06-103371-A are proposed.

According to a method described in JP-2002-300412-A, an inputted image is divided into small areas by a predetermined method, and colors are reduced by reducing halftone levels in each of the small areas.

According to a method described in JP-H06-103371-A, a plurality of representative colors are selected from a color image to be processed, and colors that are not selected as the representative colors are substituted by representative colors most closest thereto, respectively. The color image is divided based on the representative colors to obtain a plurality of partial image areas. If it is determined that a change in image quality is not visually recognized when one of the partial image areas and another adjacent thereto are integrated, the one of the partial image areas is integrated into the another of the partial image areas adjacent thereto. The integration process is repeated for each of the partial image areas to thereby reduce colors in the entire color image.

According to the conventional method described in JP-2002-300412-A explained above, since colors are reduced by reducing the number of halftone levels, areas having similar colors may be converted into areas having an identical color. As a result, in the case where there are a plurality of bars having similar colors but different meanings, for example, as in the case of FIG. 18, the plurality of bars could be converted to the bars in an identical color. If such conversion is performed, the significance of the graph is changed. Therefore, this method is not suitable for reducing colors in the graphics/table/graph area.

According to the conventional method described in JP-H06-103371-A explained above, one of partial image areas and another of partial image areas adjacent thereto are compared, and it is determined whether or not a change in image quality can be visually recognized if the two areas are integrated. This way of determination is performed on each of the partial image areas that are adjacent to the one of the partial image areas. Then, if it is determined that no change in image quality is visually recognized, the integration is performed. Since this integration process is performed further for all of the partial image areas one by one, an amount of calculation increases, and it may take a long time to process.

SUMMARY OF THE INVENTION

In view of the problem described above, it is an object of the present invention to perform subtractive color processing in a preferable manner and in a way simpler than that in the conventional case on an image including many areas, such as areas of graph, table, and graphics, each of which is supposed to be expressed in a single color.

According to an embodiment of the present invention, a subtractive color method includes the following steps. A most used color that is a most popularly used color in an image is obtained. Small pixel groups having a color of which a color difference with respect to the most used color is smaller than a predetermined threshold value and having a size thereof that is smaller than a predetermined size are extracted from among pixel groups formed of continued pixels having an identical color other than the most used color in the image. A resultant image resulted from applying the most used color to portions corresponding to the small pixel groups in the image is generated.

According to another embodiment of the present invention, a subtractive color method includes the following steps. In a first step, a most used color that is a most popularly used color in a first image having a predetermined size is obtained. In a second step, pixel groups formed of continued pixels having an identical color other than the most used color in the first image are extracted as first pixel groups. In a third step, the pixel groups having a color of which a color difference with respect to the most used color is larger than a predetermined threshold value or having a size thereof that is larger than a predetermined size are defined as second pixel groups among the first pixel groups thus extracted, an image having an area identical with that of the first image and filled with the most used color is obtained as a second image, then portions corresponding to the second pixel groups are replaced with the second pixel groups, respectively, so that a resultant image, based on the second image, having the portions of which colors are replaced with colors of the corresponding second pixel groups, respectively, is generated.

DESCRIPTION OF THE PREFERRED EMBODIMENTS

Figure 1:
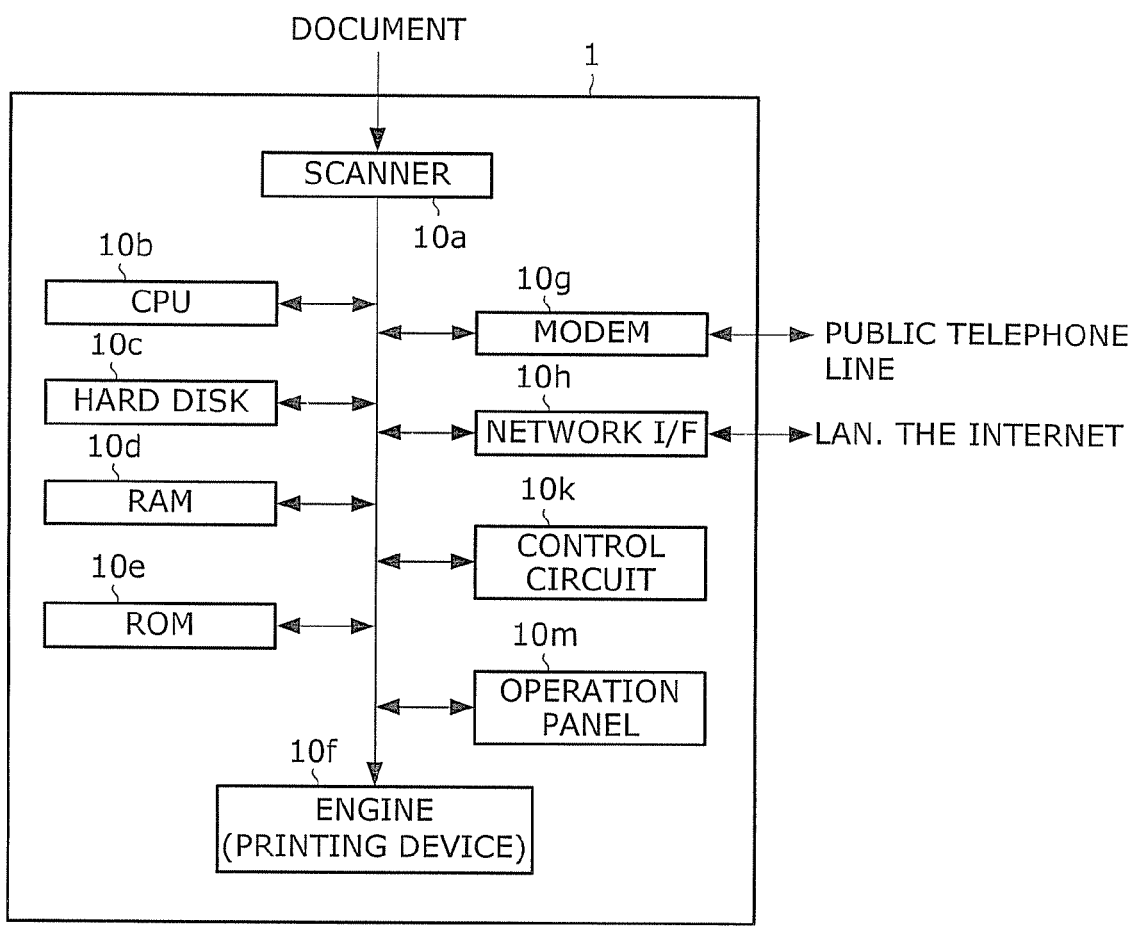
FIG. 1 illustrates an example of a hardware configuration of an image forming apparatus according to an embodiment of the present invention.

FIG. 1 illustrates an example of a hardware configuration of an image forming apparatus 1 according to an embodiment of the present invention.

The image forming apparatus 1 is an image processing apparatus that integrates a variety of functions, such as copying, scanning, faxing, network printing, document server functionality, and file transfer functionality. Such an apparatus is also sometimes called a combination machine or an MFP (Multi-Function Peripheral).

As shown in FIG. 1, the image forming apparatus 1 is configured of a scanner 10a, a CPU 10b, a hard disk 10c, a RAM 10d, a ROM 10e, a printing device 10f, a modem 10g, a network interface 10h, a control circuit 10k, an operational panel 10m, and so on.

The scanner 10a is a device that optically scans images such as photographs, text, drawings, charts, and so on that are printed on a paper document (hereinafter, simply referred to as "document") and creates digital data thereof. The scanned image is stored as image data in a format, such as TIFF, JPEG, or bitmap, expressed as RGB (red (R), green (G), and blue (B)). It is also possible to store the image data in the PDF format (Portable Document Format) by specifying that format in advance.

The CPU 10b performs processing for converting the image data of the document scanned by the scanner 10a into a file in a format such as TIFF, JPEG, bitmap, or PDF. The CPU 10b also performs overall control of the image forming apparatus 1, such as detecting input from a user, controlling displays made on the operational panel 10m, and the creation of e-mail.

The printing device 10f is a device for printing, onto a paper, an image represented by the image data obtained by scanning using the scanner 10a or an image represented by the image data sent from another device. In the case where the image forming apparatus 1 is capable of color printing, the printing is performed using four colors of toner, namely, yellow, magenta, cyan, and black.

The operational panel 10m is a device through which the user makes various inputs with respect to the image forming apparatus 1 and is made up of an operation portion, a display portion, etc. Using the operational panel 10m, the user can perform various input operations, such as selecting the format in which to store image data, setting scanning conditions, inputting commands to start or execute processes, and inputting e-mail addresses.

The modem 10g incorporates an NCU (Network Control Unit) and connects to another fax terminal via an analog public line to perform data control and modulation/demodulation of fax data based on a facsimile protocol, and so on.

The network interface 10h is a NIC (Network Interface Card), and is for connecting to another device via a ILAN, the Internet, or the like.

The control circuit 10k is a circuit for controlling devices such as the hard disk 10c, the operational panel 10m, the scanner 10a, the printing device 10f, the modem 10g, and the network interface 10h. The control circuit 10k can be formed of, for example, hardware circuitry using various electronic components.

The hard disk 10c stores programs, data, and so on for implementing the functions of the various portions described later using FIG. 2. These are read out and stored as necessary in the RAM 10d, and the programs are executed by the CPU 10b. Part or all of these programs or data may be stored in the ROM 10e. Alternatively, some or all of the functions shown in FIG. 2 may be implemented by the control circuit 10k.

Figure 2:
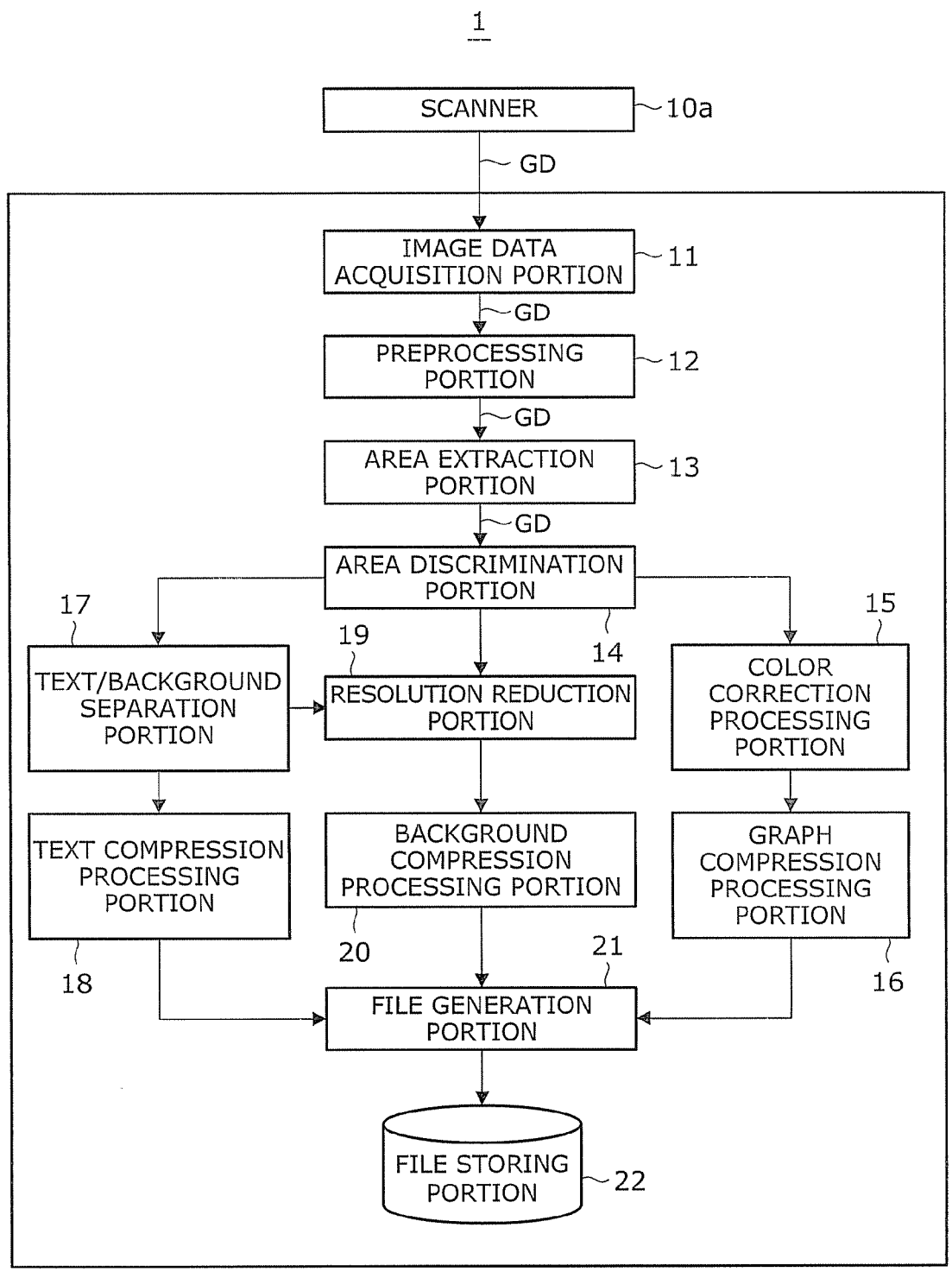
FIG. 2 illustrates an example of a functional configuration of the image forming apparatus.
Figure 3A:
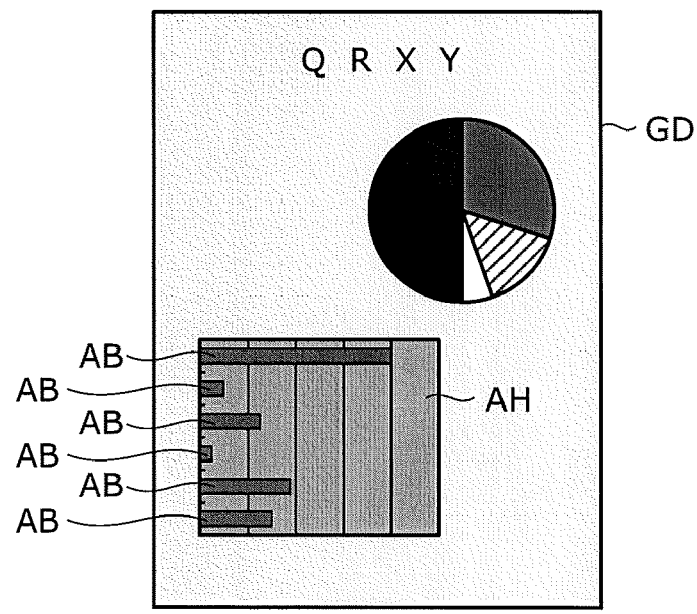
FIGS. 3A and 3B illustrate an example of an image of a document.
Figure 3B:
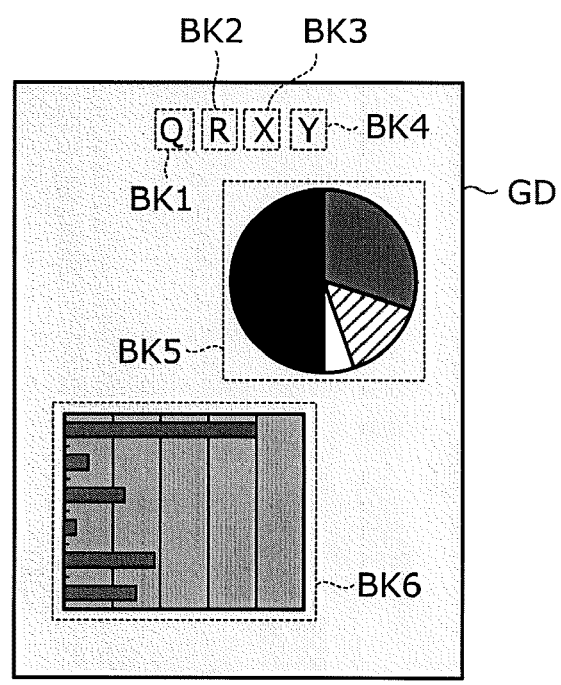
Figure 4A:
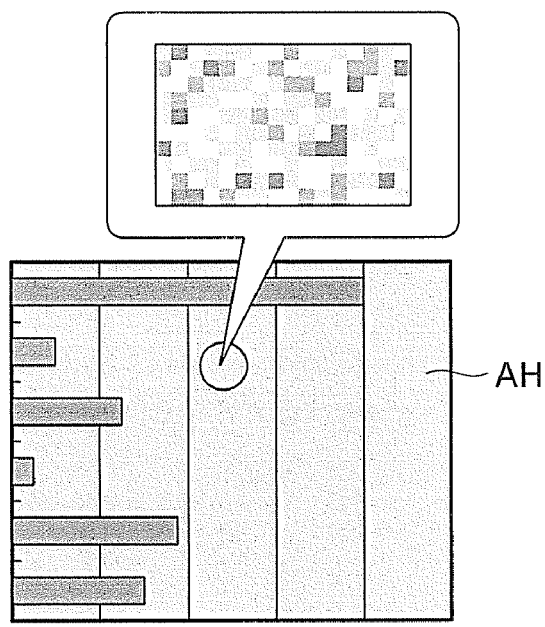
FIGS. 4A and 4B illustrate uneven density in an image of a bar graph.
Figure 4B:
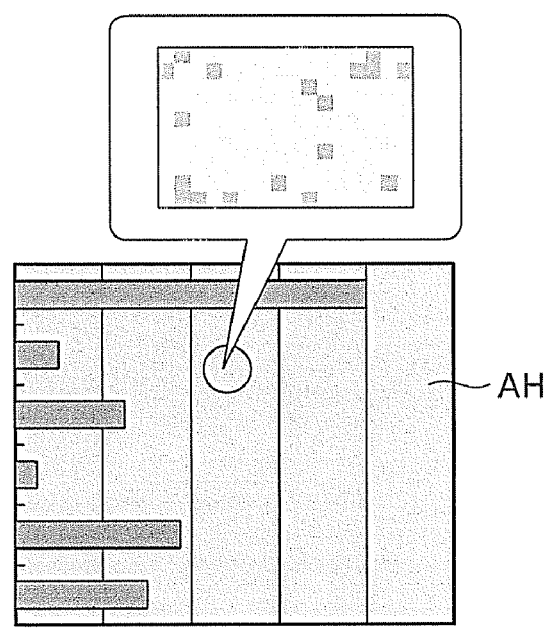

FIG. 2 illustrates an example of a functional configuration of the image forming apparatus 1. FIGS. 3A and 3B illustrate an example of an image of a document. FIGS. 4A and 4B illustrate uneven density in a bar graph image. Next, a description will be given of processes performed by the various portions of the image forming apparatus 1 when document image data GD obtained by using the scanner 10a to scan the document is converted into a file in PDF format (PDF file) and then the resultant file is stored.

As shown in FIG. 2, the image forming apparatus 1 is configured of an image data acquisition portion 11, a preprocessing portion 12, an area extraction portion 13, an area discrimination portion 14, a color correction processing portion 15, a graph compression processing portion 16, a text/background separation portion 17, a text compression processing portion 18, a resolution reduction portion 19, a background compression processing portion 20, a file generation portion 21, a file storing portion 22, and the like.

When the user sets the document in the scanner 10a, sets the storing format to PDF, and inputs a command to execute the scan, the scanner 10a scans the image of the document, and generates document image data GD expressed in RGB in a format such as bitmap. Here, it is assumed that the document has an image including a graph illustrated in FIG. 3A printed thereon.

The image data acquisition portion 11 then acquires the document image data GD. The preprocessing portion 12 generates image data represented by hue, saturation, and lightness by performing HSL conversion on the document image data GD, and further binarizes image data of lightness (lightness image data)

The area extraction portion 13 extracts areas depicting each of the objects such as text, photograph, graphics, graph, and table that are included in the image (document image) of the document image data GD. This process is performed in cooperation with the preprocessing portion 12, for example, in the following manner.

The preprocessing portion 12 generates lightness image data from the document image data GD and binarizes the lightness image data thus generated. The area extraction portion 13 performs labeling on the binarized image (binary image) obtained through binarization. This means that black pixel groups, which are black pixels that are laid uninterruptedly next to each another in the binary image, are detected. The black pixel groups located relatively close to each another are detected as one black pixel group. Through this process, the pixel group that forms an object is detected as a black pixel group. Then, a region of quadrangle shape (quadrangular region) that encapsulates the detected black pixel group is defined. For example, the coordinates of the pixels at the top-left and bottom-right in the binary image within the quadrangular region are obtained. Through this process, as shown in FIG. 3B, blocks BK1, BK2, and so on which are quadrangular regions each of which encapsulates each of the objects in the document image, are obtained. Hereinafter, each of the blocks BK1, BK2, and so on may be collectively referred to as "block BK". Similarly, other data or elements may be collectively referred to by omitting a serial number or an alphabetical letter added after a reference symbol.

The area discrimination portion 14 determines the type of block BK based on the size of the block BK or the properties of the image in the block BK. In the present embodiment, the area discrimination portion 14 determines which of the types, namely text, photograph, graph, table, or graphics, each block belongs to. The photograph area, for example, is determined based on the lightness and the hue of the image. Usually, it is often the case that many colors are used in the photograph image. Therefore, if the dispersion degrees of hue and lightness in an image of a block BK are large, then the type of that block BK is determined as photograph.

Generally, images of graph, table, graphics, and the like contain many portions that are supposed to be expressed by a single color. The portions that are supposed to be expressed by a single color, although a plurality of colors may be included in actual cases, are supposed to be essentially expressed by a single color and appear to be expressed by a single color to human eyes.

For example, in the case of the image of the bar graph in FIG. 3A, the bar portion AB in the graph and the background portion AH serving as a background to the bar in the graph are the portions that are supposed to be expressed by a single color. However, in the image represented by the document image data GD that is obtained by scanning, although the portions that are supposed to be expressed by a single color appear to be expressed in a single color as a whole, there is minute uneven density in color as shown in FIG. 4A in an enlarged view. This means that not a single color but a plurality of colors are included.

The color correction processing portion 15 performs processing (color correction processing) for properly removing the above-mentioned uneven density included in the image within the block BL whose type is determined as graph, table, or graphics. The color correction processing is implemented by the first method or the second method. Such methods will be described in detail later.

The graph compression processing portion 16 compresses data, which has been subjected to the color correction processing, using a lossless compression technique such as the FLATE method.

The text/background separation portion 17 performs processing for separating the text portion from the background portion included in the block BK that is determined by the area discrimination portion 14 as a text type.

The text compression processing portion 18 compresses data of pixels that constitute the text using a lossless compression technique such as the MMR method. In this process, the compression is made without performing resolution reduction processing.

The resolution reduction portion 19 performs resolution reduction processing on a portion of the document image corresponding to a block BK that is determined as a photograph type. In addition, the resolution reduction portion 19 performs resolution reduction processing on a background portion that is so identified by the text/background separation portion 17.

The background compression processing portion 20 compresses the data of a background to the photograph or the text, after the resolution reduction processing is applied thereto, using a lossy compression technique such as the JPEG method.

The file generation portion 21 generates a PDF file by using pieces of compressed data produced by the graph compression processing portion 16, the text compression processing portion 18, and the background compression processing portion 20, respectively. The file storing portion 22 stores the generated PDF file.

Figure 5:
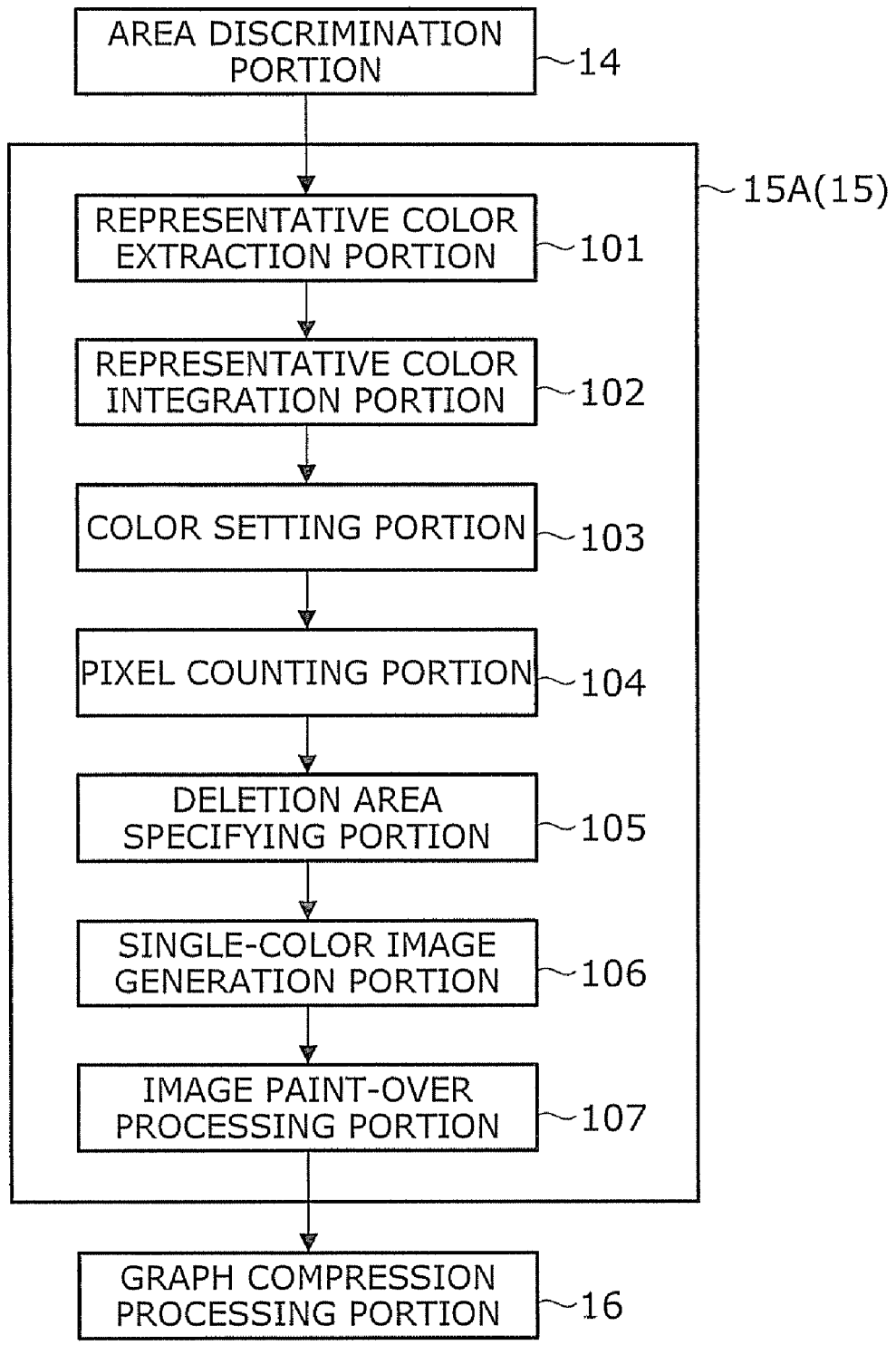
FIG. 5 illustrates an example of a configuration of a color correction processing portion.
Figure 6:
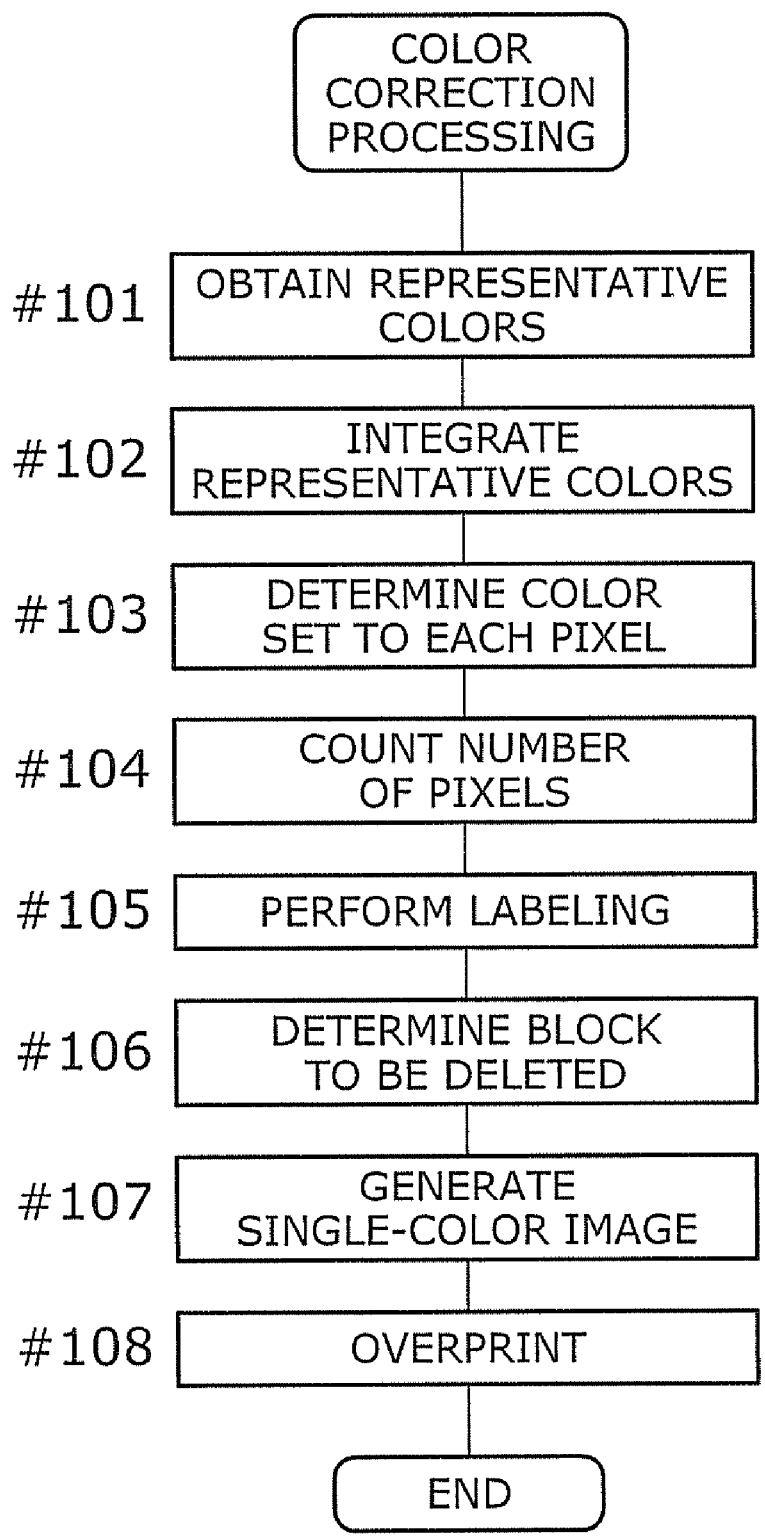
FIG. 6 is a flowchart depicting a flow of color correction processing by a first method.
Figure 7:
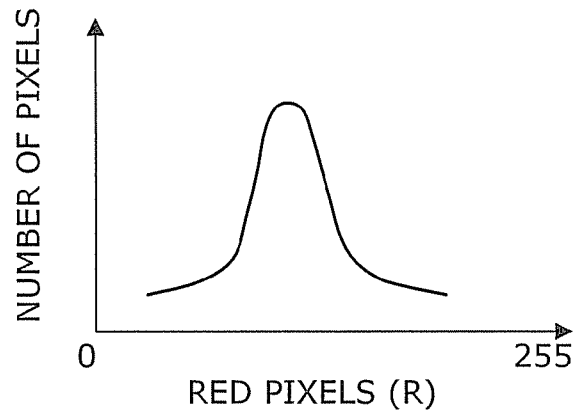
FIG. 7 is a histogram illustrating relationships between density values of pixels and the number of pixels of a graphics/table/graph block.
Figure 7:
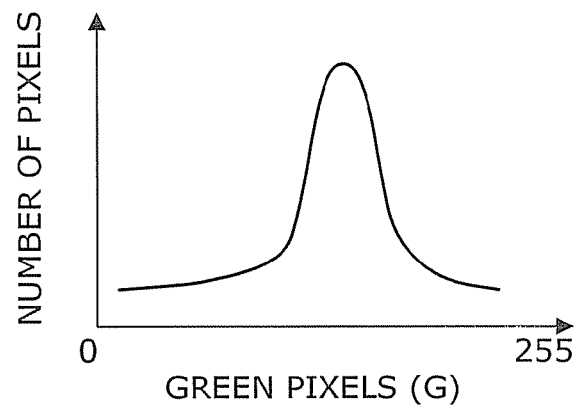
Figure 7:
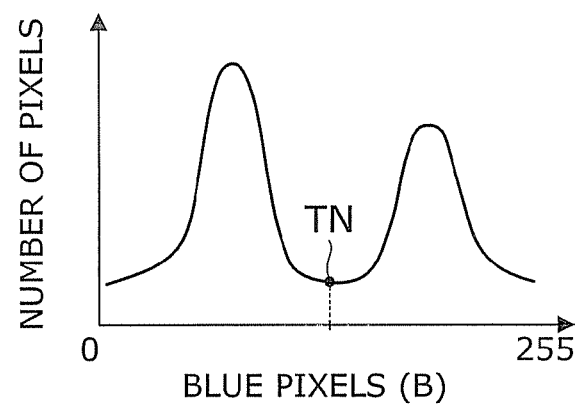
Figure 8A:
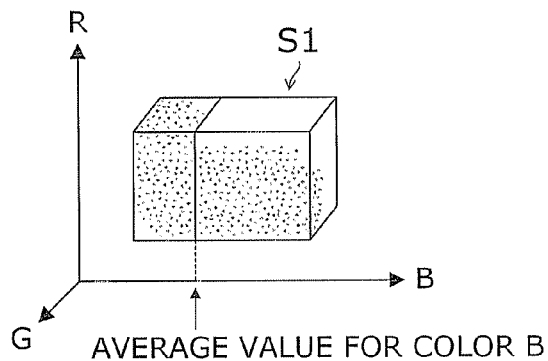
FIGS. 8A to 8D illustrate distributions of pixels of the graphics/table/graph block in RGB color space.

FIG. 5 illustrates an example of a configuration of a color correction processing portion 15A; FIG. 6 is a flowchart depicting a flow of color correction processing by the first method; FIG. 7 is a histogram illustrating relationships between each density value of pixels and the number of pixels in a graphics/table/graph block BKz; FIGS. 8A to 8D illustrate distributions of pixels of the graphics/table/graph block BKz in RGB color space; FIG. 9 illustrates each of obtained representative colors in RGB color space; and FIGS. 10A to 10D illustrate an example of a bar graph image depicting stages during a process until the completion of the process according to the first method.

As shown in FIG. 5, the color correction processing portion 15 is configured of a representative color extraction portion 101, a representative color integration portion 102, a color setting portion 103, a pixel counting portion 104, a deletion area specifying portion 105, a single-color image generation portion 106, an image paint-over processing portion 107, etc, and performs color correction processing by the first method on an image in a block BK (hereinafter, "graphics/table/graph block BKz") whose type is determined as graph, table, or graphics by the area discrimination portion 14.

In FIG. 5, the representative color extraction portion 101 obtains a predetermined number of representative colors for the graphics/table/graph block BKz based on the density value of each of RGB colors of individual pixels in the graphics/table/graph block BKz (step #101 in FIG. 6). Here, a description will be given of how to obtain the representative colors with reference to FIG. 7 and FIGS. 8A-8D.

FIG. 7 is an example of a histogram indicating the number of pixels for each of RGB colors in the graphics/table/graph block BKz at each density value. FIG. 8A illustrates distributions of pixels in the image of the graphics/table/graph block BKz in RGB color space. FIGS. 8A to 8D are depicted using rectangular parallelepipeds to indicate the distributions in a simplified manner. Note that a set of pixels in the graphics/table/graph block BKz is expressed by "set S1".

Before obtaining the representative colors, first, a dispersion degree in density of the pixels in the graphics/table/graph block BKz for which the representative colors are sought is obtained for each of RGB colors based on Equation (1) described below. Then, the largest dispersion degree among RGB colors is detected.

$$\text{(dispersion degree)} = \sqrt{\frac{1}{N} \sum_{i=0}^{N-1} (X_i - X_{ave})^2} \quad \text{Equation (1)}$$

(where $X_i$ represents density value of each pixel, $X_{ave}$ represents average value of density values in the graphics/table/graph block BKz, and N represents the number of pixels in the graphics/table/graph block BKz.)

In the case of the example in FIG. 7, the dispersion degree is large in such a distribution as shown in the histogram of color B. Hereinafter, a description will be given assuming that the dispersion degree of color B indicates the maximum.

An average value of the density values for color B for which the dispersion degree indicates the maximum is obtained. As illustrated in FIG. 8A, the set S1 is divided along a plane perpendicular to an axis B passing through that average value.

Figure 8B:
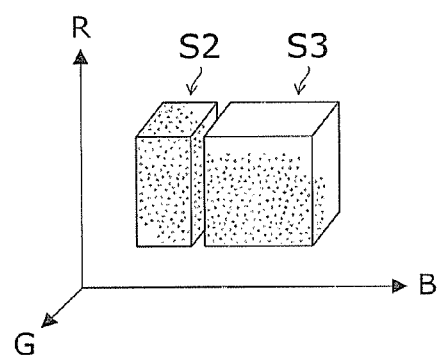
Figure 8C:
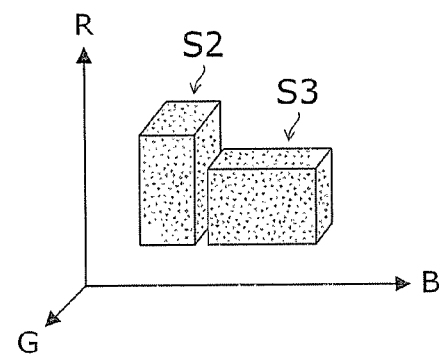
Figure 9:
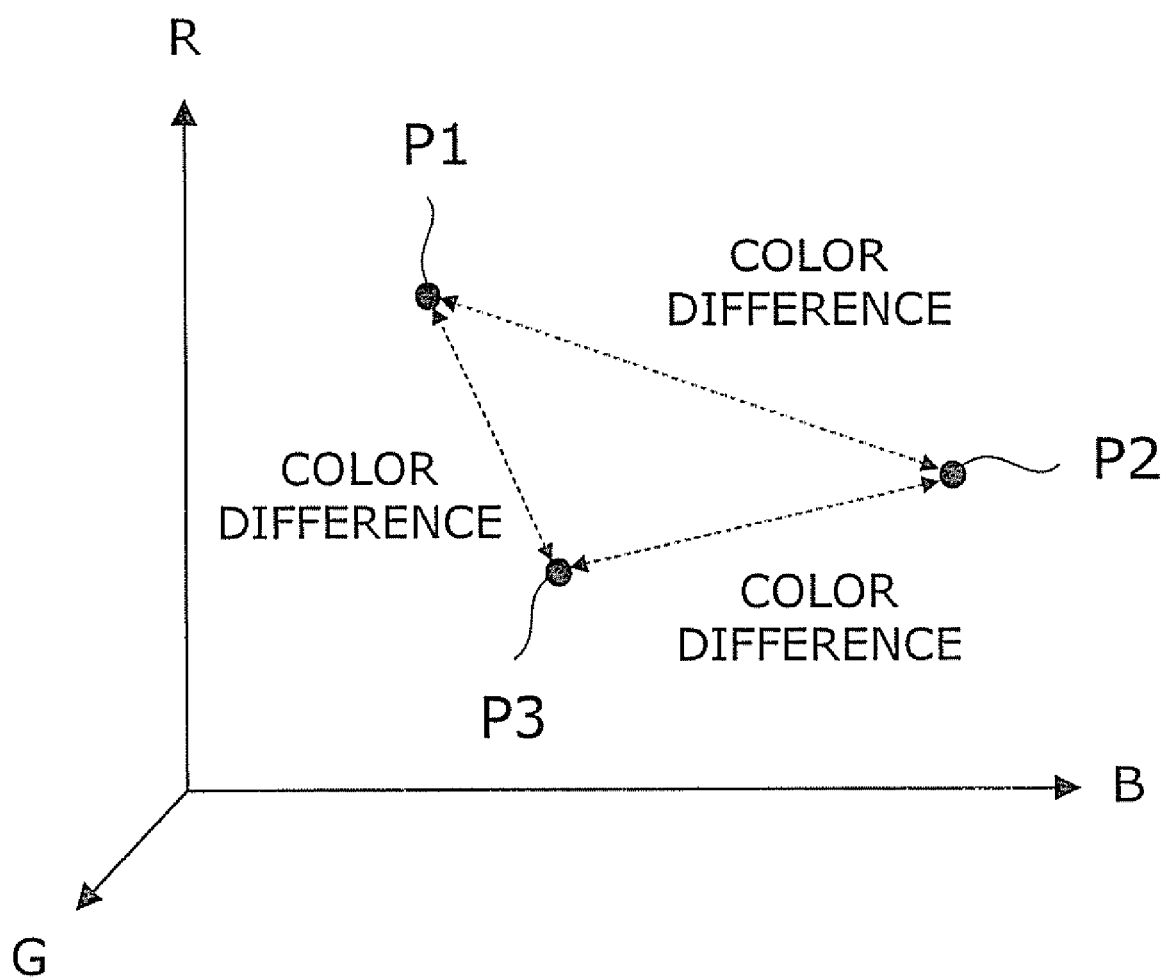
FIG. 9 illustrates each of obtained representative colors in RGB color space.

Through this process, the set S1 is divided into sets S2 and S3 as shown in FIG. 8B. The distributions of pixels belonging to the sets S2 and S3, respectively, in RGB color space are assumed to be like the ones shown in FIG. 8C.

A dispersion degree of each of RGB colors will be obtained for each of the newly created sets S2 and S3. Through this process, six dispersion degrees can be obtained. Then, the largest among the six dispersion degrees is obtained. In this example, it is assumed that the color R of the set S2 has the maximum dispersion degree.

Figure 8D:
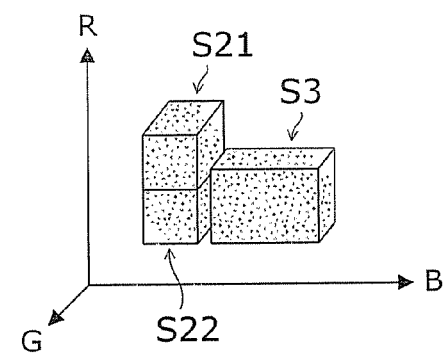

An average value of the density values for color R in the set S2 which shows the maximum among the six dispersion degrees is obtained. The set S2, which indicates the maximum dispersion degree, is divided along a plane perpendicular to an axis R passing through that average value. As a result, three sets, namely sets S21, S22, and S3, are created as shown in FIG. 8D. A dispersion degree for each of RGB colors for each of these three sets is obtained, and the division is performed in a similar manner. Such division will be repeated until the number of sets S reaches a predetermined number.

When the number of sets S reaches the predetermined number, an average value of the density values for each of RGB colors in each of the sets S is obtained. In each of the sets S, a color represented by the individual average values of RGB colors is then recorded as a representative color for each of the sets S. Through this process, a plurality of representative colors (representative colors P1, P2, and so on) are obtained. In this embodiment, about 16-20 representative colors are obtained.

It is to be noted that, when the set S is divided, instead of using the plane passing through the average value of the density values of the color that indicates the maximum dispersion degree, it is also possible to use a plane passing through the lowest point in a valley of the histogram for that color, that is, a plane passing through a density value at a point TN where the number of pixels becomes smallest, to thereby divide the set S.

The representative color integration portion 102 obtains a color difference between the obtained representative colors, and performs processing for integrating the representative colors of which the color difference is equal to or lower than a predetermined threshold value (step #102). The color difference between the representative colors is expressed by a distance between the representative colors in RGB color space, as shown in FIG. 9. The distance between the representative colors is obtained based on Equation (2) shown below.

$$\text{(color difference)} = \sqrt{(R_a - R_b)^2 + (G_a - G_b)^2 + (B_a - B_b)^2} \quad \text{Equation (2)}$$

(where $R_a$, $G_a$, and $B_a$ represent individual density values of RGB colors of one representative color; and $R_b$, $G_b$, and $B_b$ represent individual density values of RGB colors of the other representative color, respectively.)

The integration of the representative colors is performed by, for example, obtaining an average value of density values for each of RGB colors between two representative colors to be integrated (for example, an average value for color R is $(R_a+R_b)/2$; an average value for color G is $(G_a+G_b)/2$; and so on), and assigning a color expressed by the respective average values of RGB colors as an integrated representative color. Alternatively, instead of using a simple average value as described above, a weighted average value, which is weighted in accordance with the numbers of pixels included in respective sets S to which the two representative colors belong, may be used. Then, a color expressed by the respective weighted average values for RGB colors may be assigned as an integrated representative color.

Instead of using the predetermined threshold value for integrating the representative colors as discussed above, it is also possible to decide on representative colors that will be subjected to the integration by choosing representative colors having the smallest color difference first and thereafter in increasing order of the color difference, so that the chosen representative colors undergo the integration processing sequentially until the number of the representative colors reaches a predetermined number. In this case, the integration processing ends when the number of representative colors is reduced to 10 or so.

The color setting portion 103 sets the representative color, which has been decided for a set S, to each pixel that belongs to the set S and stores the result (step #103). When the representative colors are integrated into an integrated representative color, the integrated representative color is set to the pixels belonging to two sets S for which respective two representative colors have been chosen prior to the integration.

Alternatively, the individual representative colors that have been obtained are compared with original colors of individual pixels (original colors in the document image). Through the comparison, a representative color having the smallest color difference with respect to the individual pixels may be set as a representative color for the individual pixels.

The pixel counting portion 104 obtains the number of pixels to which a representative color is set for each of the representative colors (step #104). Hereinafter, in the first method, a representative color corresponding to the largest number of pixels to which the representative color is set is referred to as "most-used color", and the representative colors other than the most used color are referred to as "non-most-used color". This most-used color is obtained, for example, based on a histogram that is generated to indicate a relationship between the representative colors and the numbers of pixels.

As shown in FIG. 4A, a portion that is supposed to be expressed by a single color includes a plurality of colors due to uneven density. By expressing the pixels having similar colors by a single representative color as described above, the number of colors is greatly reduced, and the uneven density is removed to a certain extent as shown in FIG. 4B. However, as seen in FIG. 4B, some uneven density may remain.

The deletion area specifying portion 105 performs processing for specifying a minute area left as shown in FIG. 4B and forming the uneven density as noise to be deleted. The processing is performed as described below.

Labeling is performed on a pixel group that is formed of continuous pixels of an identical non-most-used color (step #105). This means that a quadrangular region encapsulating individual pixel groups is obtained. Hereinafter, the quadrangular region is referred to as "identical-color block DK".

Among the obtained identical-color blocks DK, an identical-color block DK which has a color difference between the color (non-most-used color) of the encapsulated pixel group and the most-used color is equal to or less than a threshold value and a size smaller than a predetermined size is specified as an identical-color block DK to be deleted (step #106). Hereinafter, the identical-color block DK to be deleted is referred to as "block DKs to be deleted", and an identical-color block DK other than the block DKs to be deleted is referred to as "block DKh not to be deleted".

The single-color image generation portion 106 and the image paint-over processing portion 107 generate, in a manner described below, an image of the graphics/table/graph block BKz from which a portion corresponding to the block DKs to be deleted which is specified so by the deletion area specifying portion 105 is deleted.

Figure 10A:
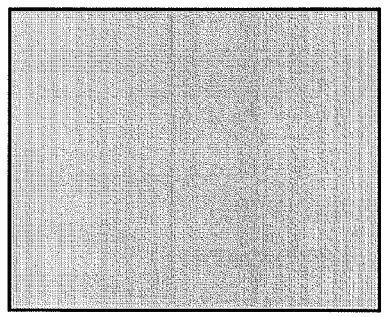
FIGS. 10A to 10D illustrate an example of a bar graph image depicting stages during a process until the completion of the process according to the first method.

The single-color image generation portion 106 generates an image (single-color image) having an area that is identical with that of the graphics/table/graph block BKz to be processed and filled with the most-used color as shown in FIG. 10A (step #107).

Figure 10B:
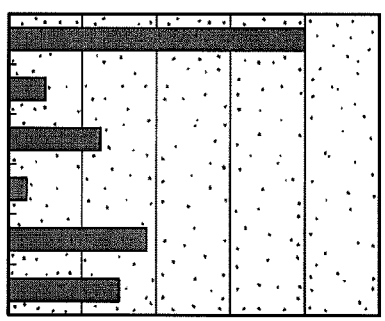
Figure 10C:
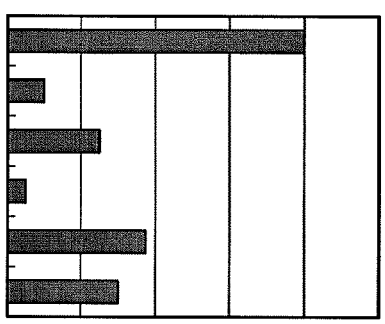
Figure 10D:
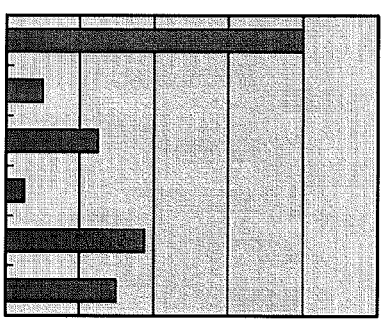

The image paint-over processing portion 107 generates an image shown in FIG. 10C by deleting the pixel groups of the block DKs to be deleted from an image expressed by pixel groups of the block DKs to be deleted and the block DKh not to be deleted shown in FIG. 10B and draws the image thus generated over a single-color image (step #108). To be specific, a portion in the single-color image which corresponds to the pixel groups of the block DKh not to be deleted is replaced with the pixel groups of the block DKh. An image thus generated is equivalent to an image that is generated by replacing the color in each corresponding portion in the single-color image with the color of the corresponding pixel group. Through this process, the noise that causes the uneven density shown in FIG. 4B is removed, and an image having the background portion AH serving as a background to the graph expressed by a single color is generated.

In other words, according to the process describe above, an identical-color block DK encapsulating pixel groups that are formed of continuous pixels having an identical color is defined. An identical-color block DK having a color difference between a color of pixel groups that are encapsulated and a most-used color smaller than a predetermined threshold value and at the same time having a size smaller than a predetermined size is extracted as a block to be deleted. In a single-color image that is obtained when an area having the same size as the image of the graphics/table/graph block BKz to be processed is filled with the most-used color, an image having portions corresponding to the pixel groups of the identical-color block DK other than those extracted as a block to be deleted is generated by replacing the color with the color of the pixel groups.

Alternatively, a similar image may be generated in the following procedure. Among pixel groups formed of continuous pixels having an identical color other than the most-used color, a pixel group having a color difference between the most-used color and the color of the pixel group smaller than a predetermined value and having a size smaller than a predetermined size is extracted. Then, a portion corresponding to the extracted pixel group in an image to be processed is filled with the most-used color, and an image thus processed is generated.

In stead of the above, the following procedure may be used to generate the image. An identical-color block DK encapsulating pixel groups that are formed of continued pixels having an identical color is defined. An identical-color block DK is extracted if it encapsulates pixel groups whose color difference with respect to the most-used color is larger than a predetermined threshold value or if it has a size larger than a predetermined size. In a single-color image that is obtained when an area having the same size as the image of the graphics/table/graph block BKz to be processed is filled with the most-used color, a portion corresponding to the extracted identical-color blocks DK is replaced with the pixel groups of the corresponding identical-color blocks, so that an image having the corresponding portions replaced with the color of the pixel groups is generated.

Figure 11:
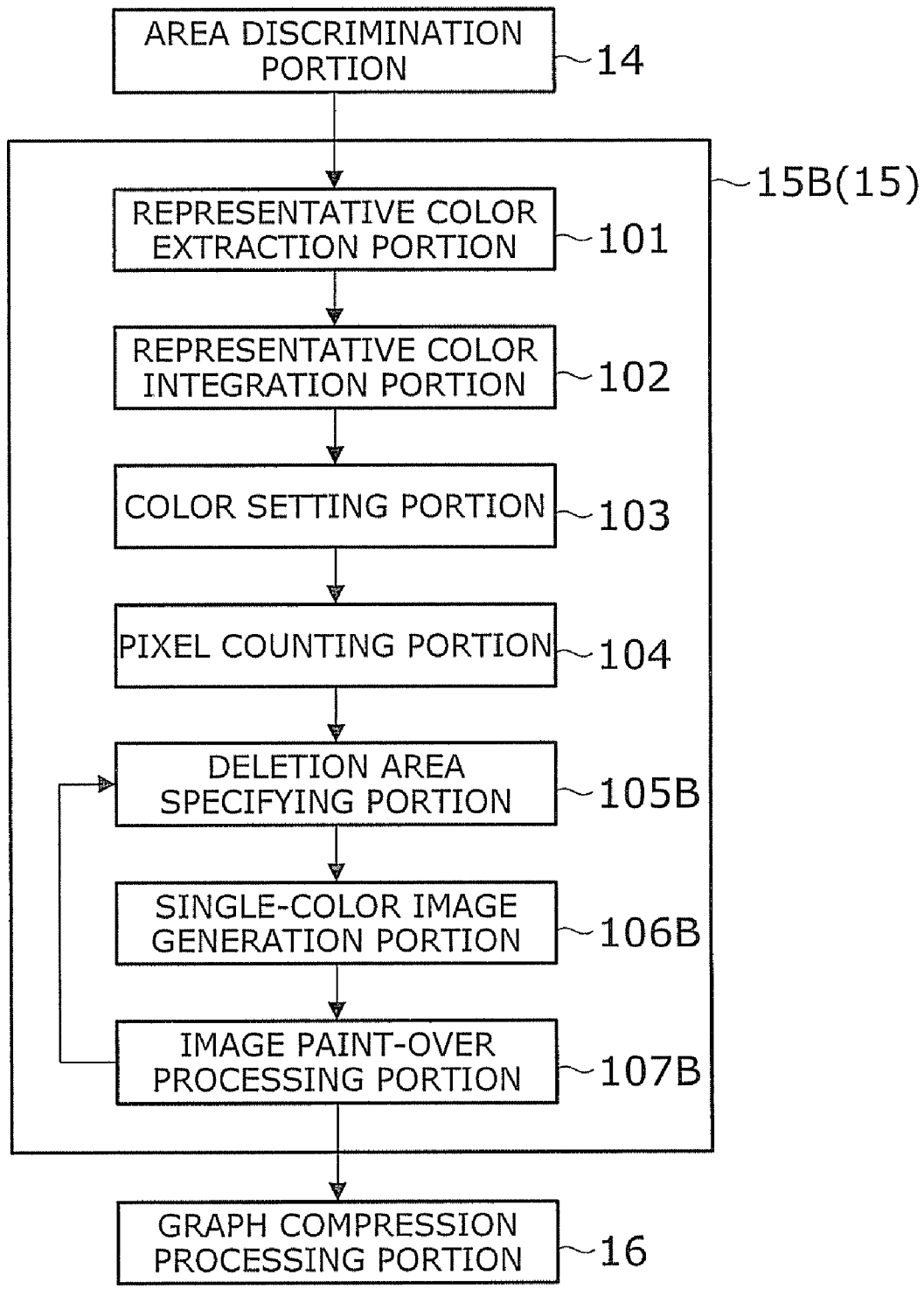
FIG. 11 illustrates an example of a configuration of the color correction processing portion.
Figure 12:
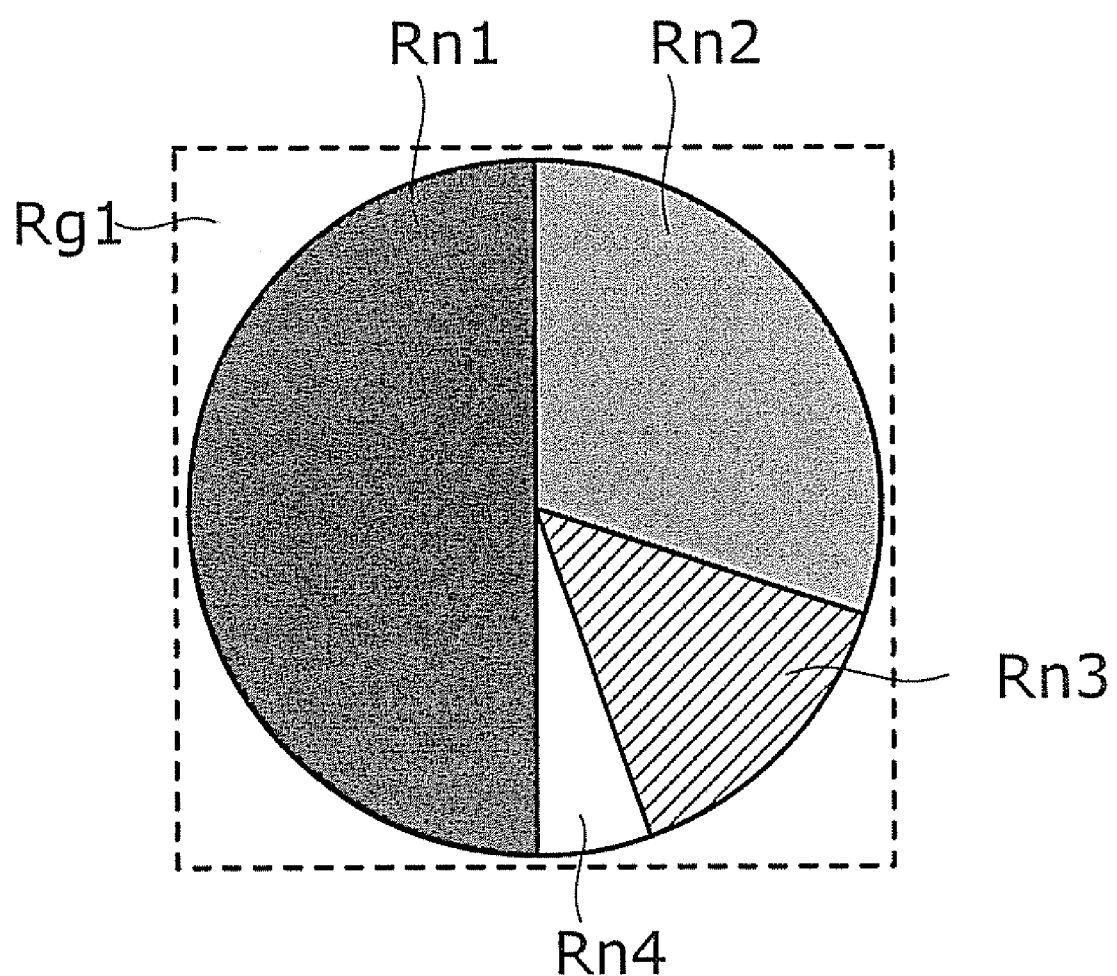
FIG. 12 illustrates a circle graph as an object to be processed by a second method.
Figure 13:
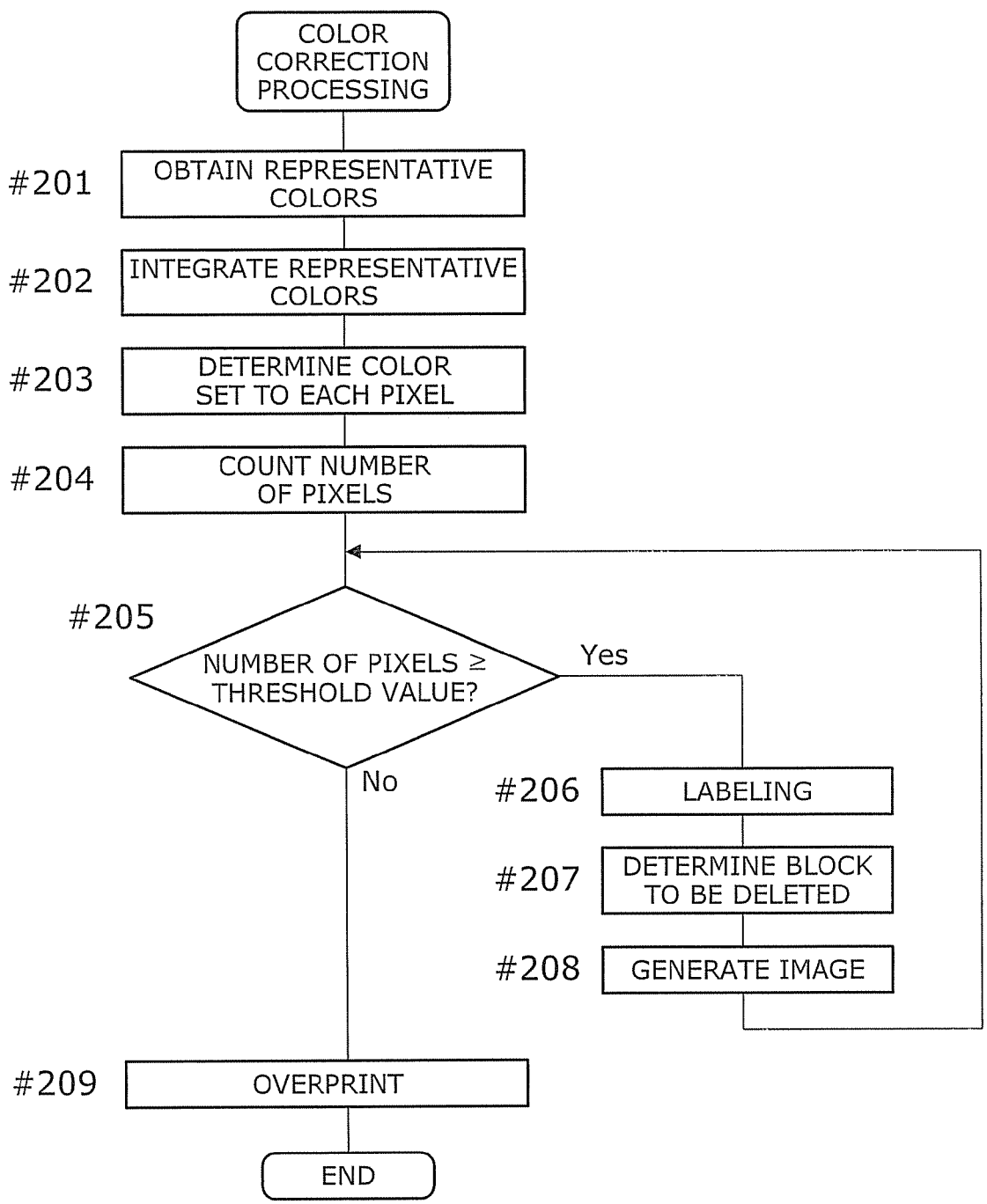
FIG. 13 is a flowchart depicting a flow of color correction processing by the second method.

FIG. 11 illustrates an example of a configuration of the color correction processing portion 15B. FIG. 12 illustrates a circle graph as an object to be processed by a second method. FIG. 13 is a flowchart depicting a flow of color correction by the second method. FIGS. 14A to 16D illustrate an example of a circle graph image depicting stages during a process until the completion of the process according to the second method.

The color correction processing portion 15B shown in FIG. 11 performs color correction processing by the second method. In the second method, by repeating the processing for removing the noise until a predetermined condition is satisfied, an image is generated so as to have an image quality superior to that in the first method and an amount of data smaller than that in the first method. Hereinafter, a description will be given of an example when the graphics/table/graph block BKz (block BK5 in FIG. 3B) including the image of the circle graph shown in FIGS. 3A and 3B is to be processed. As shown in FIG. 12, hereinafter, each sector of the circle graph is referred to as graph areas Rn1, Rn2, and so on, and an area serving as a background to the circle graph is referred to as an outer graph area Rg1. Although the graph area Rn3 is expressed by diagonal lines, it is an area supposed to be expressed by a single color as in the case of other graph areas.

In FIG. 11, a representative color extraction portion 101 obtains a predetermined number of representative colors for the graphics/table/graph block BKz to be processed (step #201 in FIG. 13). A representative color integration portion 102 integrates the representative colors, among the obtained representative colors, having a color difference between one and another smaller than a predetermined threshold value (step #202). A color setting portion 103 sets a representative color of a set S to each pixel that belongs to the set S and stores the result (step #203). A pixel counting portion 104 counts, for each of the representative colors, the number of pixels to which the representative color is set (step #204), and stores the representative color set to the largest number of pixels, as a first most-used color. In this example, the color of the graph area Rn1 having the largest area and thus including the largest number of pixels is defined as the first most-used color.

Figure 14A:
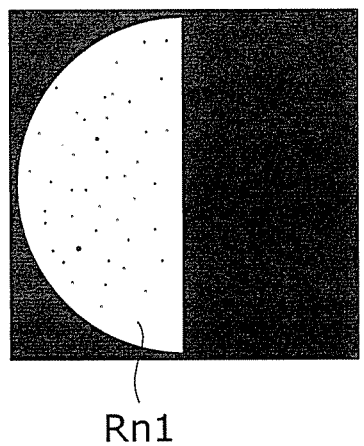
FIGS. 14A to 14C illustrate an example of a circle graph image depicting stages during a process until the completion of the process according to the second method.

The first most-used color is dealt with as a target representative color, and the processing in step #205 and onward is performed. If the number of pixels set with the first most-used color, i.e., the target representative color, is equal to or larger than a predetermined number (Yes in step #205), a deletion area specifying portion 105B performs processing for removing pixels deemed to be noise in pixel areas (areas indicated by black dots in FIG. 14A) having representative colors other than the first most-used color (hereinafter, referred to as "first non-most-used color"). In doing so, for respective pixel groups formed of pixels having an identical first non-most-used color, identical-color blocks DK encapsulating such pixel groups are obtained (step #206). Among the obtained identical-color blocks, an identical-color block DK is specified as a block DKs to be deleted if it encapsulates pixel groups having a color (that is, the first non-most-used color given to such pixel groups) whose color difference with respect to the first most-used color is smaller than a predetermined threshold value and if it has a size smaller than a predetermined size (step #207). As shown in FIG. 14A, the pixel group expressed by a black dot in the graph area Rn1 has a color close to the first most-used color which is a color of neighboring pixels, and an identical-color block DK encapsulating such a pixel group is small. Consequently, the identical-color block DK encapsulating such a pixel group is specified as a block DKs to be deleted.

Figure 14B:
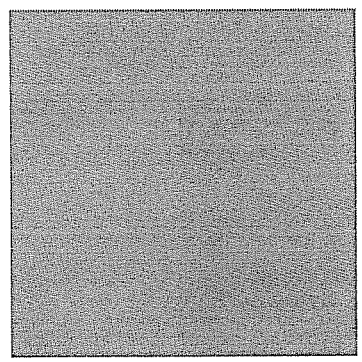
Figure 14C:
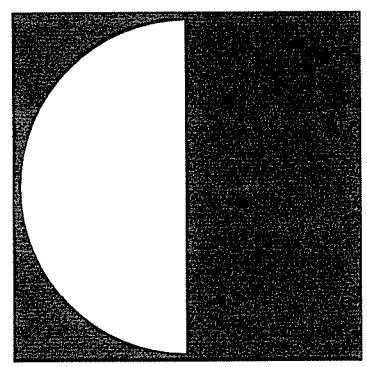

The single-color image generation portion 106B generates a single-color image having an area identical with that of the graphics/table/graph block BKz to be processed and filled with the first most-used color as shown in FIG. 14B (step #208).

Then, a representative color which is set to the largest number of pixels among the first non-most-used colors, i.e., a representative color among the representative colors obtained by the representative color extraction portion 101 and set to the second largest number of pixels (hereinafter, referred to as "second most-used color") undergoes the processing in step #205 and onward as a target representative color. Hereinafter, the first most-used color, the second most-used color, and so on may be referred to simply as "most-used color".

In this example, many of the pixels included in the graph area Rn2 having the second largest area are set with the second most-used color having the second largest number of pixels.

If the number of pixels having the second most-used color that is the target representative color is equal to or larger than a predetermined number (Yes in step #205), an area (area shown in black color in FIG. 14C) obtained by deleting the pixels of the block DKs to be deleted that is so specified in step #208 from the area (area shown in black color in FIG. 14A) of pixels having the first non-most-used color undergoes processing in steps #206 to #208 as an area to be processed.

In the process, the deletion area specifying portion 105B removes pixels that are deemed to be noise from an area shown in black color in an area (area shown in black color in FIG. 15A) of pixels having the first non-most-used color (hereinafter, referred to as "second non-most-used color) other than the second most-used color. First, for each of the pixels configured of pixels having an identical second non-most-used color, identical-color blocks DK encapsulating respective pixel groups are obtained (step #206). Among the obtained identical-color blocks DK, an identical-color block DK is specified as a block DK to be deleted if it encapsulates pixel groups having a second non-most-used color whose color difference with respect to the second most-used color is equal to or smaller than a predetermined threshold value and if it has a block size smaller than a predetermined size (step #208). In this example, the identical-color block DK encapsulating pixels indicated by black dots in the graph area Rn2 is specified as the block DKs to be deleted.

Figure 15A:
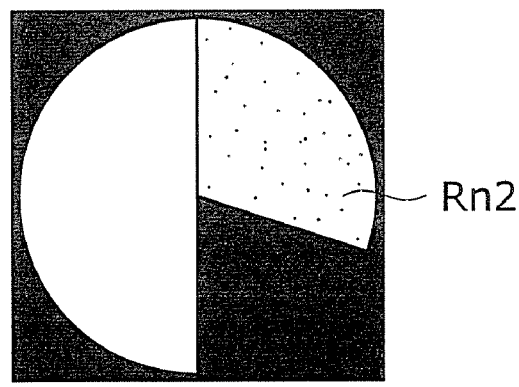
FIGS. 15A to 15C illustrate the example of the circle graph image depicting stages during the process until the completion of the process according to the second method.
Figure 15B:
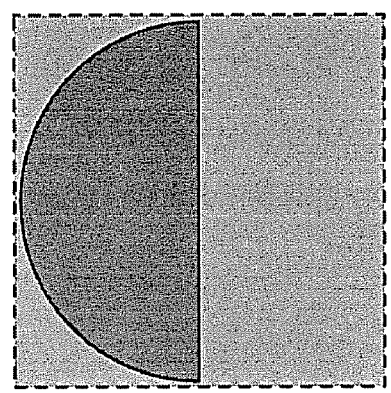
Figure 15C:
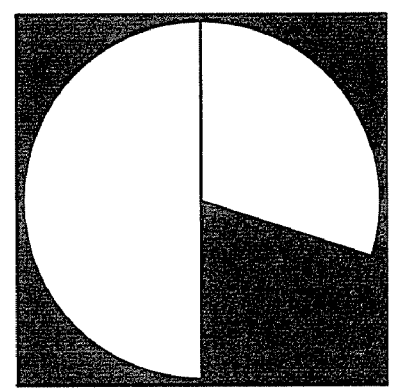

The single-color image generation portion 106B generates an image as shown in FIG. 15B. The image is obtained by replacing a color in the portions corresponding to the areas (portions shown in black color in FIG. 14C) to be processed, in a single-color image shown in FIG. 14B. To be more specific, first, an area having the same size as the area to be processed is filled with the second most-used color to produce a single-color image, and, then, the produced single-color image is painted over the single-color image shown in FIG. 14B that has been already generated.

Next, a representative color (third most-used color) set to the largest number of pixels among the second non-most--used colors undergoes, as a target representative color, the processing in step #206 and onward in a repeating and similar manner. In this example, many of the pixels, included in an outer graph area Rg1 having the third largest area, will have a third most-used color.

If the number of pixels having the third most-used color as a representative color, is equal to or larger than a predetermined number (Yes in step #205), an area (area shown in black color in FIG. 15C) resulted from deleting the pixels in the block DKs to be deleted that is so defined in step #208 from an area (area shown in black color in FIG. 15A) of pixels having the second non-most-used color undergoes the processing in steps #206 to #208 as a next area to be processed.

In other words, the deletion area specifying portion 105B performs processing of removing the pixels that are deemed to be noise from an area (area shown in black color in FIG. 16A) of pixels having the second non-most-used color (hereinafter, referred to as "third non-most-used color) other than the third most-used color. This means that an identical-color block DK is specified as a block DKs to be deleted if it encapsulates pixel groups therein whose color difference with respect to the third most-used color is equal to or less than a predetermined threshold value and if it has a size thereof smaller than a predetermined size (step #207). In this example, the identical-color block DK encapsulating pixels shown by black dots in the outer graph area Rg1 is specified as the block DKs to be deleted.

Figure 16A:
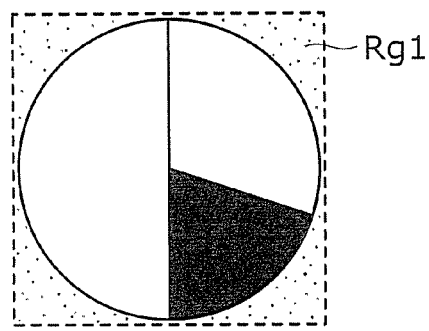
FIGS. 16A to 16D illustrate the example of the circle graph image depicting stages during the process until the completion of the process according to the second method.
Figure 16B:
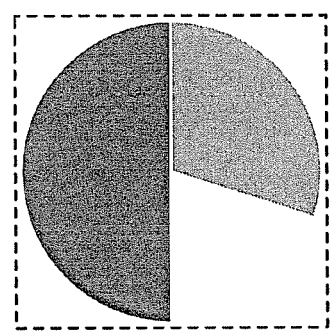
Figure 16C:
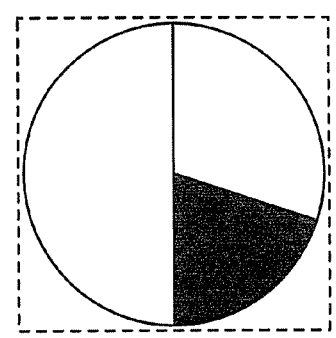

The single-color image generation portion 106B generates an image, as shown in FIG. 16B, which is resulted from applying the third most-used color to the portion corresponding to the area to be processed (area shown in black color in FIG. 15C) in the image in FIG. 15B that has been already generated.

Thereafter, a fourth most-used color, a fifth most-used color, and soon will sequentially be a target representative color, and the processing in steps #206 to #208 is repeated by using such representative colors one after another. When the number of pixels of the target representative color becomes smaller than a predetermined number (No in step #205) in step #205, the processing in step #209 is applied. Note that, in this embodiment, the description is based on the assumption that it is the number of pixels of the fourth most-used color that becomes smaller than the predetermined number.

Figure 16D:
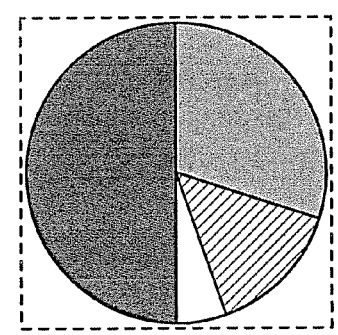

By the time it is found that the number of pixels having the fourth most-used color becomes smaller than the predetermined number (No in step #205), the single-color image generation portion 106B has generated an image (image shown in FIG. 16B) by painting single-color images on top of each another, and then the single-color image generation portion 106B completes the image of the circle graph by painting an image of the remaining areas on top of the image so far generated. To be more specific, the image of the circle graph as shown in FIG. 16D is finished by painting a portion of the document image, which corresponds to an area (area shown in black color in FIG. 16C) obtained by removing the pixels of the block DKs to be deleted specified by the deletion area specifying portion 105 from the area (area shown in black color in FIG. 16A) of pixels having the pixels of the third non-most-used color, on top of the image (image shown in FIG. 16B) generated so far by the single-color image generation portion 106B.

Figure 17:
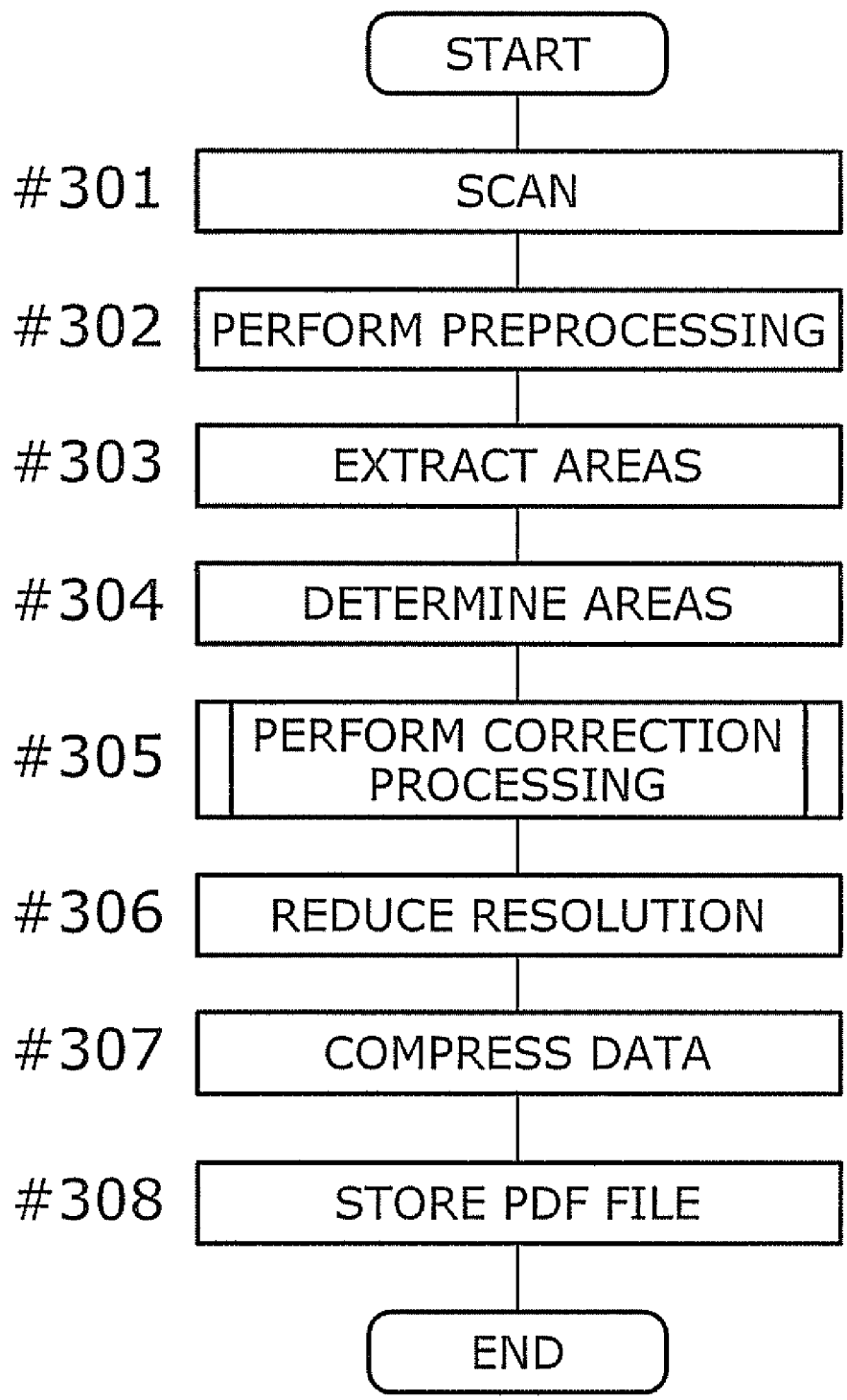
FIG. 17 is a flowchart depicting a flow of overall processes performed by the image forming apparatus when a PDF file is generated.
Figure 18:
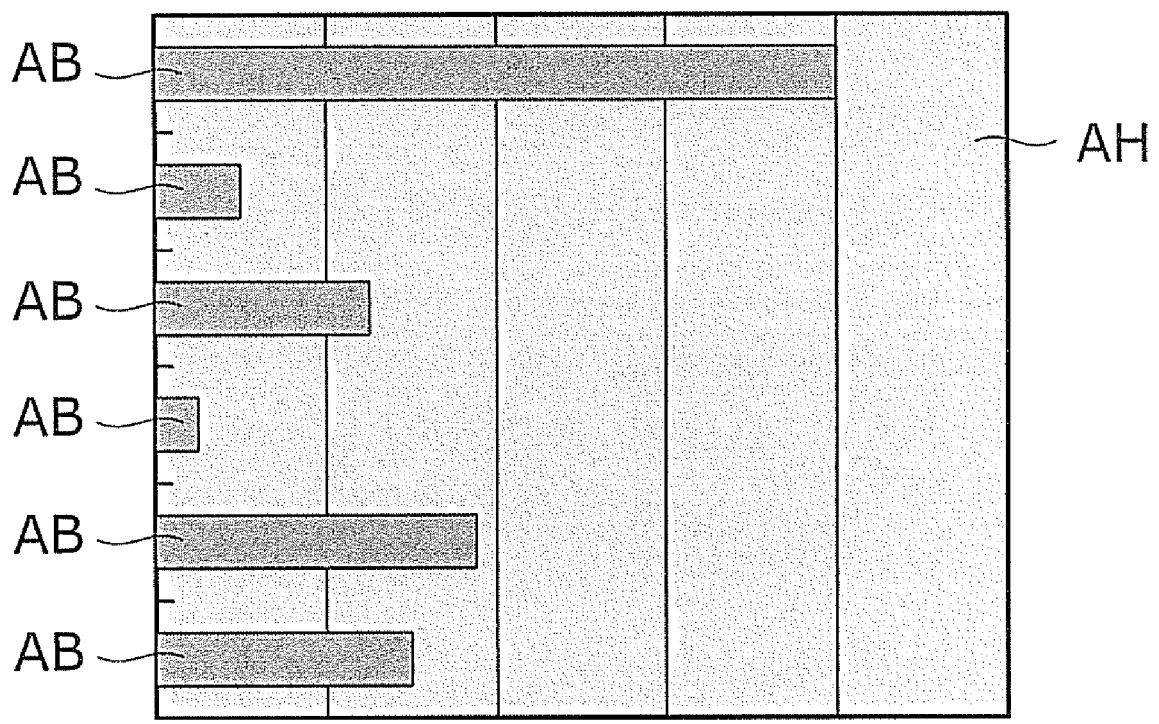
FIG. 18 illustrates a bar graph image.

FIG. 17 is a flowchart depicting a flow of overall processes performed by the image forming apparatus 1 when a PDF file is generated.

When a user places a document in the scanner 10a, selects a PDF format as a storing format, and instructs the execution of scanning, the image forming apparatus 1 scans the document (step #301 in FIG. 17) and performs a process for converting the document image data GD obtained by scanning into a PDF file.

In performing the process, the image forming apparatus 1 applies preprocessing to the document image data GD (step #302) and obtains blocks GL encapsulating various objects included in the data (step #303). Further, the image forming apparatus 1 determines which one of the types, text, photograph, graph, table, and graphics each of the blocks BK thus obtained belongs to (step #304).

Color correction processing is performed on the graphics/table/graph block BKz whose type is determined to be one of the graph, table, and graphics (step #305). The color correction processing was already described with reference to FIGS. 6 and 13. It is also possible to provide both of the functions, namely the color correction processing portions 15A and 15B to the image forming apparatus 1, and a switch or the like may be used to select therebetween depending on which of the first and second methods is used to perform the color correction processing.

Then, an image of a portion serving as a background to the text included in the block BK which is determined to be the text type and an image included in the block BK which is determined to be the photograph type undergo resolution reduction processing (step #306).

Data of each of the blocks BK undergoes compression processing corresponding to the type of the block BK (step #307). In other words, for a block BK of text type, the text data included therein is compressed using a lossless compression technique such as the MMR method. For a block BK of graph, table, or graphics type, data that has been subjected to the color correction processing is compressed using a lossless compression technique such as the FLATE method. For a block BK of photograph type and for a background portion of the block BK of text type, data that has been subjected to resolution reduction processing is compressed using a lossy compression technique such as the JPEG method.

Then, a PDF file is generated by using the compressed data of each of the blocks BK and stored (step #308).

As discussed above, in the present invention, color correction is performed on a portion that is supposed to be expressed by a single color in an image (digital image data) of graph, table, or graphics so that such a portion is expressed by a single color. In general, in an image represented by image data obtained by scanning a document, the uneven density, such as that shown in FIG. 4A, in a portion that is supposed to be expressed by a single color becomes more apparent as the area of that portion becomes larger. With this as a backdrop, according to the first method, an image having a largest portion that is supposed to be expressed in a single color is redrawn using the single color by performing simple processing, thereby increasing the image quality efficiently and appropriately.

According to the second method, by repeating processing for removing noise (steps #206 to #208), portions that are supposed to be expressed by a single color are redrawn in decreasing order of size of the areas. As a result, it is possible to generate an image having a better quality than in the first method.

As discussed above, according to the present embodiment, an image is generated by redrawing an area such as the graph area Rn1 that is supposed to be expressed by a single color using a single representative color. As a result, the noise portions included in that area are replaced with a most-used color, i.e., a representative color used for redrawing. The redrawing may be performed using a color taking a color of the noise in account, instead of using the most-used color. For example, the redrawing may be performed by using a color represented by an average value between the representative color set to the pixels of the noise portions and the most-used color. Alternatively, the redrawing may be performed by using a color represented by a weighted average value based on the number of pixels having the most-used color and the number of pixels of the noise portions.

In the present embodiment, the description is given by using the images in FIGS. 10A-10D, 14A-14C, 15A-15C, and 16A-16D. However, the color correction may be performed without actually generating pieces of data of such images.

Note that part of functions shown in FIG. 2 may be implemented by hardware. For example, hardware serving as the input image processing portion and the output image processing portion is provided in the image forming apparatus 1. The input image processing portion receives the document image data GD from the scanner 10a and performs thereon such processing as color conversion, color correction, resolution conversion, and area discrimination. The output image processing portion performs such processing as screen control, smoothing processing, and PWM control.

Finally, the configuration and functions of all or part of the image forming apparatus 1, the details or order of the processing performed thereby, the details of the various pieces of data, and so on can be modified in various ways within the spirit of the present invention.

What is claimed is:

1. A subtractive color method comprising:
a first step of obtaining a most used color that is a most popularly used color in a first image having a predetermined size;
a second step of extracting, as first pixel groups, pixel groups formed of continued pixels having an identical color other than the most used color in the first image;
a third step of extracting, as third pixel groups from among the first pixel groups thus extracted, pixel groups having a color of which a color difference with respect to the most used color is smaller than a predetermined threshold value and having a size thereof that is smaller than a predetermined size; and
a fourth step of generating a resultant image by:
defining, as second pixel groups, the first pixel groups other than the third pixel groups;
obtaining an image, as a second image, having an area identical with that of the first image and filled with the most used color; and
replacing portions, in the second image, corresponding to the second pixel groups with the second pixel groups, respectively, so that the resultant image, based on the second image, has the portions of which colors are replaced with colors of the corresponding second pixel groups, respectively.

2. The subtractive color method according to claim 1, wherein the method further comprising:
obtaining a predetermined number of representative colors based on a color of each of pixels in a partial original image that is an image in an area having a predetermined size in an original image;
storing, for said each of the pixels included in the partial original image, a representative color closest to the color of said each of the pixels as a second color of the pixel; and
performing the first, second, third, and fourth steps after defining, as the first image, an image having said each of the pixels of the partial original image, the color of said each of the pixels being represented by the second color of the pixel.

3. A subtractive color processing apparatus that reduces colors in a first image having a predetermined size, the apparatus comprising:
a most used color detection portion that obtains a most used color that is a most popularly used color in the first image;
a first pixel group extraction portion that extracts, as first pixel groups, pixel groups formed of continued pixels having an identical color other than the most used color in the first image;
a second pixel group extraction portion that extracts, as third pixel groups from among the first pixel groups extracted by the first pixel group extraction portion, pixel groups having a color of which a color difference with respect to the most used color is smaller than a predetermined threshold value and having a size thereof that is smaller than a predetermined size; and
an image generation portion that defines, as second pixel groups, the first pixel groups other than the third pixel groups that are extracted by the second pixel group extraction portion; that obtains an image, as a second image, having an area identical with that of the first image and filled with the most used color; that replaces portions, in the second image, corresponding to the second pixel groups with the second pixel groups, respectively; and that generates a resultant image, based on the second image, having the portions of which colors are replaced with colors of the corresponding second pixel groups, respectively.

4. An image forming apparatus comprising:
a representative color calculation portion that obtains a predetermined number of representative colors based on a color of each of pixels in a partial original image that is an image in a predetermined area in an image obtained by scanning an original;
a color determination portion that determines a representative color, among the representative colors obtained by the representative color calculation portion, closest to the color of said each of the pixels as a second color of the pixel, for said each of the pixels included in the partial original image;
a most used color detection portion that obtains a most used color that is a most popularly used color in a first image that is an image having said each of the pixels of the partial original image, the color of said each of the pixels being represented by the second color that is determined by the color determination portion;
a first pixel group extraction portion that extracts, as first pixel groups, pixel groups formed of continued pixels having an identical color other than the most used color in the first image;
a second pixel group extraction portion that extracts, as third pixel groups from among the first pixel groups extracted by the first pixel group extraction portion, pixel groups having a color of which a color difference with respect to the most used color is smaller than a predetermined threshold value and having a size thereof that is smaller than a predetermined size; and
an image generation portion that defines, as second pixel groups, the first pixel groups other than the third pixel groups that are extracted by the second pixel group extraction portion; that obtains an image, as a second image, having an area identical with that of the first image and filled with the most used color; that replaces portions, in the second image, corresponding to the second pixel groups with the second pixel groups, respectively; and that generates a resultant image, based on the second image, having the portions of which colors are replaced with colors of the corresponding second pixel groups, respectively.

5. A non-transitory computer-readable storage medium storing thereon a computer program executed by a computer that performs subtractive color processing, the computer program causing the computer to perform:
obtaining a most used color that is a most popularly used color in a first image having a predetermined size;
extracting, as first pixel groups, pixel groups formed of continued pixels having an identical color other than the most used color in the first image;
extracting, as third pixel groups from among the first pixel groups thus extracted, pixel groups having a color of which a color difference with respect to the most used color is smaller than a predetermined threshold value and having a size thereof that is smaller than a predetermined size; and
generating a resultant image by:
defining as second pixel groups, the first pixel groups other than the third pixel groups;

obtaining an image, as a second image, having an area identical with that of the first image and filled with the most used color; and replacing portions, in the second image, corresponding to the second pixel groups with the second pixel groups, respectively, so that the resultant image, based on the second image, has the portions of which colors are replaced with colors of the corresponding second pixel groups, respectively.

* * * * *